US008200827B1

(12) United States Patent
Hunyady et al.

(10) Patent No.: US 8,200,827 B1
(45) Date of Patent: Jun. 12, 2012

(54) ROUTING VOIP CALLS THROUGH MULTIPLE SECURITY ZONES

(75) Inventors: Attila J. Hunyady, Milpitas, CA (US); Anil Kumar Bollineni, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1796 days.

(21) Appl. No.: 10/971,687

(22) Filed: Oct. 25, 2004

(51) Int. Cl.
 *G06F 15/16* (2006.01)
 *G06F 15/173* (2006.01)

(52) U.S. Cl. ........ 709/227; 709/228; 709/229; 709/217; 709/218; 709/219; 709/223; 709/225

(58) Field of Classification Search .......... 709/217–219, 709/223, 225, 227–229
See application file for complete search history.

(56) References Cited

U.S. PATENT DOCUMENTS

| | | | | |
|---|---|---|---|---|
| 5,999,525 A * | 12/1999 | Krishnaswamy et al. | .... | 370/352 |
| 6,615,236 B2 | 9/2003 | Donovan et al. | ............. | 709/203 |
| 6,701,432 B1 | 3/2004 | Deng et al. | .................... | 713/153 |
| 7,072,332 B2 * | 7/2006 | D'Souza | ........................ | 370/352 |
| 7,274,684 B2 * | 9/2007 | Young et al. | .................... | 370/352 |
| 7,319,857 B2 * | 1/2008 | Baldwin et al. | ............ | 455/412.1 |
| 7,493,393 B2 * | 2/2009 | Narayanan | .................... | 709/225 |
| 7,602,748 B2 * | 10/2009 | Sinnreich et al. | ............. | 370/331 |
| 7,620,033 B2 * | 11/2009 | Chu et al. | ....................... | 370/352 |
| 7,694,127 B2 * | 4/2010 | Adams et al. | .................. | 713/151 |
| 2002/0029350 A1 * | 3/2002 | Cooper et al. | ................ | 713/200 |
| 2004/0024879 A1 * | 2/2004 | Dingman et al. | ............. | 709/227 |
| 2004/0034793 A1 | 2/2004 | Yuan | .............................. | 713/200 |
| 2004/0059942 A1 | 3/2004 | Xie | ................................ | 713/201 |
| 2004/0085952 A1 | 5/2004 | Watson | .......................... | 370/352 |
| 2004/0139230 A1 | 7/2004 | Kim | ................................ | 709/245 |
| 2004/0187033 A1 * | 9/2004 | Wang | ............................. | 713/201 |
| 2004/0228291 A1 * | 11/2004 | Huslak et al. | ................. | 370/260 |
| 2004/0249960 A1 * | 12/2004 | Hardy et al. | ................... | 709/229 |
| 2005/0210292 A1 * | 9/2005 | Adams et al. | ................. | 713/201 |
| 2006/0026629 A1 * | 2/2006 | Harris et al. | ..................... | 725/32 |
| 2006/0209794 A1 * | 9/2006 | Bae et al. | ....................... | 370/352 |
| 2007/0036143 A1 * | 2/2007 | Alt et al. | ........................ | 370/352 |

OTHER PUBLICATIONS

Stefan Brunner et al.: "Voice Over IP 101, Understanding VoIP Networks," Juniper Networks White Paper, Aug. 2004, 24 pgs.
B. Biggs: "A SIP Application Level Gateway for Network Address Translation," Internet Draft Memo, Mar. 2000, 7 pgs.
C. Martin et al.: "SIP Through NAT Enabled Firewall Call Flows," Internet Draft Memo, Jul. 2001, 11 pgs.
Cisco Systems White Paper, "H.323 and SIP Integration," print date oct. 13, 2004, 6 pgs.
Josef Glasmann et al.: "Service Architectures in H.323 and SIP—A Comparison," Munich University of Technology, print date Oct. 13, 2004, 15 pgs.
IXIA Technology Guide, "Session Initiation Protocol (SIP) Technology," Copyright 1998-2004, print date Oct. 13, 2004, 12 pgs.
Ubiquity White Paper, "Understanding SIP, Today's Hottest Communications Protocol Comes of Age," print date Oct. 12, 2004, 5 pgs.

(Continued)

*Primary Examiner* — Thu Nguyen
*Assistant Examiner* — Angela Widhalm
(74) *Attorney, Agent, or Firm* — Harrity & Harrity, LLP

(57) ABSTRACT

Call setup signaling is performed across at least a first security zone, a second security zone, and a third security zone to set up a call. At least one gate is then established between the first security zone and the third security zone to enable traffic flow for the call between the first security zone and the third security zone.

20 Claims, 8 Drawing Sheets

OTHER PUBLICATIONS

"Basics about SIP," http://spsc.inw.tugraz.at/courses/asp/ss01/sip/SIP_descr.htm, print date oct. 15, 2004, 28 pgs.

"Solving the Firewall and NAT Traversal Issues for Multimedia Services over IP," Newport networks, print date Oct. 14, 2004, 14 pgs.

Peter Morrissey: "It's Time to Take a Look at SIP," Digital Convergence Workshop, Apr. 17, 2003, 4 pgs.

Gordon Daugherty: "Traversing Firewalls with Video over IP: Issues and Solutions," Visual Communications White Paper, Aug. 2003, 7 pgs.

Ingate Systems AB and Intertex Data AB White Paper by Lisa Hallingström et al.: "The SIP Protocol and Firewall Traversal," Oct. 11, 2001, 6 pgs.

A RADVision Technology White Paper, "Traversal of IP Voice and Video Data through Firewalls and NATs," 2001, 18 pgs.

Vinod K. Bhat: "Voice Over IP-The SIP Way," *Technology Review* #2001-03, Tata Consultancy Services, Apr. 2001, 13 pgs.

William Stallings: "The Session Initiation Protocol," *The Internet Protocol Journal Archived Issues*, vol. 6, Issue 1, Mar. 2003, Cisco Systems, 9 pgs.

Internet Engineering Task Force Internet Draft Memo by J. Rosenberg et al.: "NAT and Firewall Scenarios and Solutions for SIP," Jun. 24, 2002, 58 pgs.

"Traversing Firewalls and NATs With Voice and Video Over IP, An Examination of the Firewall/NAT Problem, Traversal Methods, and Their Pros and Cons," Wainhouse Research, Apr. 2002, 14 pgs.

http://www.informatik.uni-bremen.de/~prelle/terena/cookbook/main/ch-04s07.html, Chapter 4.7. Firewalls and NAT, print date Oct. 15, 2004, 8 pgs.

Victor Paulsamy et al.: "Network Convergence and the NAT/Firewall Problems," Proceedings of the 36th Hawaii International Conference on System Sciences-2003, 10 pgs.

Master's Thesis by Fredrik Thernelius, "SIP, NAT, and Firewalls," May 2000, Ericsson Department of Teleinformatics, 69 pgs.

\* cited by examiner

ROUTING VOIP CALLS THROUGH MULTIPLE SECURITY ZONES

BACKGROUND OF THE INVENTION

A. Field of the Invention

The principles of the invention relate generally to packet transmission, and more particularly, to transmission of multimedia related packets across multiple security zones.

B. Description of Related Art

With the increasing ubiquity of the Internet and Internet availability, there has been an increasing desire to leverage its robust and inexpensive architecture for voice telephony services, commonly referred to as voice over IP (internet protocol), or VoIP. Toward this end, standards for internet telephony have been promulgated by the both the International Telecommunication Union Telecommunication Standardization Sector (ITU-T) in the form of H.323 rev 5 (2003), "Packet based multimedia communications systems" as well as the Internet Engineering Task Force (IETF) in the form of RFC 3261 (2002), "Session Initiation Protocol (SIP)" to enable set-up and teardown of the media sessions.

Under each of these standards, a session initiation message is initially routed between a calling party and a proxy server or gatekeeper (collectively, "proxy server"). The proxy server performs call processing, number lookup, routing, and any other required processing of the session initiation message. The session initiation message also typically includes a session description portion that contains information about the media that the caller wishes to use for the session. The proxy server then forwards the session initiation message to the called party (sometimes via redirect servers or other intermediary entities). In response to the received invitation message, a response message having a similar session description portion may be returned to the calling party via the proxy server. When the calling party receives the response message, it forwards an acknowledgement message to the called party. This completes call setup and enables subsequent exchange of real-time media directly between the calling and called parties.

All of the messages exchanged are typically in the form of a packet of data having both header and payload information. Most forms of signaling information are contained in packet headers, while information relating to the media being exchanged between the parties is typically contained within the payload portion. In addition, addressing information, such as Internet Protocol (IP) addresses, Uniform Resource Locators (URL's), Uniform Resource Identifiers (URI's), or user datagram protocol (UDP) addresses, etc. for both the calling and called parties may be contained in both the header and payload. The existence of addressing information in packet payloads has caused difficulties with respect to both firewall and network address translation (NAT) implementation.

FIG. 1 is a generalized block diagram illustrating the main components of a VoIP system 100. Generally speaking, there are two main components in most VoIP networks: network servers or gatekeepers 102 and user agents 104 and 106. Each user agent or user device 104,106 is an end-user device or system that operates on someone's behalf to either place or receive a call. Although the caller is sometimes referred to as a user agent client (UAC) (i.e., the requesting party) and the recipient is sometimes referred to as a user agent server (UAS) (i.e., the responding party), most user agent devices incorporate both UAC and UAS functionality. There are two different types of network servers 102 as well: a proxy server, which receives requests, determines which server to send it to, and then forwards the request; and a redirect server, which receives requests, but instead of forwarding them to the next hop server, tells the client to contact the next hop directly.

Using these main components, the steps in initiating a VoIP session are generally straightforward. As shown in FIG. 1 user agent 104 initially sends an invitation request to network server 102, which in this case is a proxy server. Proxy server 102 will look in its database to determine where to send the invitation request and forward the request to the appropriate next hop, which in this case is user agent 106. It should be understood that, although FIG. 1 illustrates proxy server 102 connecting directly to user agent 106, in practice there could be any number of hops between proxy server 102 and user agent 106. Once the invitation message reaches user agent 106, user agent 106 may respond with an OK message, indicating that it has accepted the invitation to participate in the call. This OK message is then forwarded to user agent 104 via proxy server 102. When user agent 104 receives the OK message, user agent 104 responds with an acknowledgement message, which, when received, starts the session between the parties.

In most modern network environments, firewalls constitute the main protection mechanism for keeping unwanted traffic away from a private network. In general, a firewall is positioned between the private network and the public network such that all traffic passing between the two networks first passes through the firewall. The traffic may then be subjected to various filtering policies which identify the types and sources/destinations of traffic permitted to flow based upon information contained within the packet headers. One exemplary filtering policy may permit all outgoing traffic (e.g., to any destination address) from IP address 134.138.29.17 (the source address) on port 8080 (the source port). Conversely, incoming traffic to 134.138.29.17 on port 8080 may not be permitted unless initially requested by 134.138.29.17. By enabling the enforcement of these various policies, only known and identifiable types of network traffic may be allowed to enter or exit the private network, thereby providing security to the network.

Although most firewall devices support only two distinct security zones, a public or UNTRUST zone and a private or TRUST zone, several firewall providers offer three or more security zones, with a third zone sometimes referred to as a demilitarized zone or DMZ. Often, firewall DMZ's will be implemented for server type devices (e.g., web servers, mail servers, etc.) which, by necessity, must be available to the public network. In addition, additional security zones may be established each having a unique security profile.

Unfortunately, it is the rigorous and strict nature of most conventional firewalls themselves that typically prevents successful establishment of VoIP sessions. For example, addressing information relating to the media exchange between parties is typically contained with the session description portion of a VoIP packet's payload. For example, in a SIP session, addresses and related port(s) on which media is expected is included within the session description protocol (SDP) information found in the message's payload. This information is dynamically assigned upon generation of the each message and cannot be adequately predicted by the firewall. Accordingly, when media from either party is received at the firewall, its passage is denied because no enabling policy is identified. The alternative to blanket denial is to leave a wide range of ports unprotected to facilitate passage of the media. Clearly, this is untenable from a security standpoint. To remedy this issue, intelligent Application Level Gateways (ALG) may be implemented on the firewall which identify VoIP messages as they are received at the firewall. The VoIP messages are then parsed for information contained within their headers and payloads. This information may then be used to create gates or "pinholes" in the firewall interfaces which enable the media to be exchanged between the parties. A pinhole is typically defined to allow traffic based on source and destination addresses and ports.

In addition to problems posed by the restrictive nature of firewalls alone, many firewalls also implement NAT. Generally speaking, NAT is a technology for enabling multiple devices on a private local area network (LAN) having private IP addresses to share a single, or pre-defined group of public IP addresses. Because the private IP addresses maintained by the devices are not routable from outside of the LAN, the NAT must perform translation between the private and public IP addresses at the point where the LAN connects to the Internet.

In operation, when a device on the LAN wishes to initiate a connection with a device outside of the LAN, the device will send all traffic to the NAT first. The NAT examines the header of each outgoing packet and replaces the source or return address contained therein, which is the device's private address, with it's own public address before passing the traffic to its destination on the Internet. In some implementations, port translation is also provided, enabling the NAT to also modify the source and return ports on the traffic. These translations are stored in a table for use in identifying recipients for received traffic. When a response is received, the NAT queries the NAT table, identifies the proper recipient and passes the response to that device.

Unfortunately, as discussed above, addressing information for VoIP traffic may be contained within the payload information as well as the header of outgoing packets. Accordingly, conventional NATs fail to accurately translate all outgoing traffic, resulting in dropped or discarded failed connections. To remedy this deficiency, the ALGs described above may be configured to translate information contained within the payloads as well as the headers of VoIP messages. Unfortunately, current ALGs fail to support scenarios involving more than two distinct security zones where call messages are routed through multiple zones between calling parties.

Accordingly, there is a need for a VoIP routing solution that enables call setup and media exchange across multiple security zones.

SUMMARY OF THE INVENTION

One aspect consistent with principles of the invention is directed to method for routing voice packets across multiple security zones. The method includes: performing call setup signaling across at least a first security zone, a second security zone, and a third security zone to set up a call; and establishing at least one gate between the first security zone and the third security zone to enable traffic flow for the call between the first security zone and the third security zone.

A second aspect consistent with principles of the invention is directed toward a network device for routing voice over internet protocol (VoIP) call messages across multiple security zones. The network device may include at least one TRUST zone interface configured to receive a call invitation message from a first user device located in first security zone; at least one DMZ interface configured to communicate with at least one proxy server located in a second security zone; at least one UNTRUST zone interface configured to communicate with at least one second user device located in third security zone; and application level gateway (ALG) logic configured to dynamically route the call invitation between the first user device, the proxy server, and the second user device.

In a third aspect consistent with principles of the invention, a device may include means for receiving a call invitation message from a private user device located in first security zone; and means for dynamically routing call invitation related messages between the private user device, a proxy server, and a public user device in multiple security zones.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of embodiments of the principles of the invention refers to the accompanying drawings. The same reference numbers in different drawings may identify the same or similar elements. Also, the following detailed description does not limit the invention. Instead, the scope of the invention is defined by the appended claims and equivalents.

As described herein, a firewall or other interface device dynamically identifies VoIP messages passing through multiple security zones and modifies firewall pinholes so as to facilitate efficient exchange of messages between the parties.

SYSTEM OVERVIEW

Figure 1:
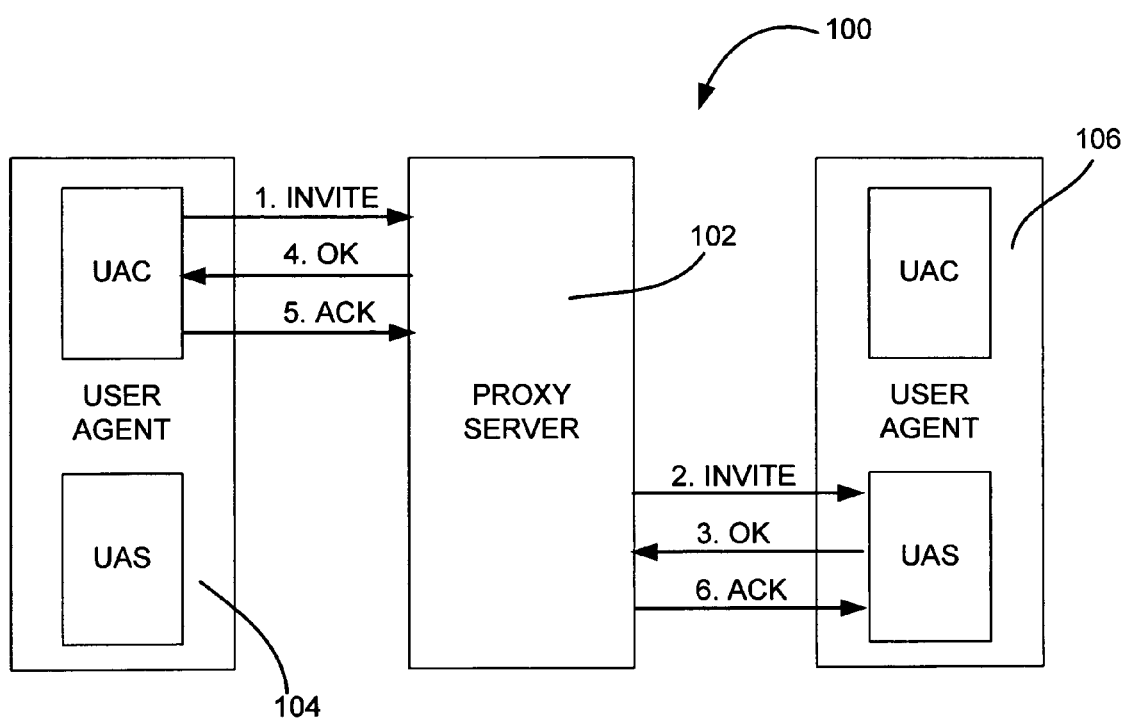
FIG. 1 is a generalized block diagram illustrating the main components of a conventional VoIP system.
Figure 2:
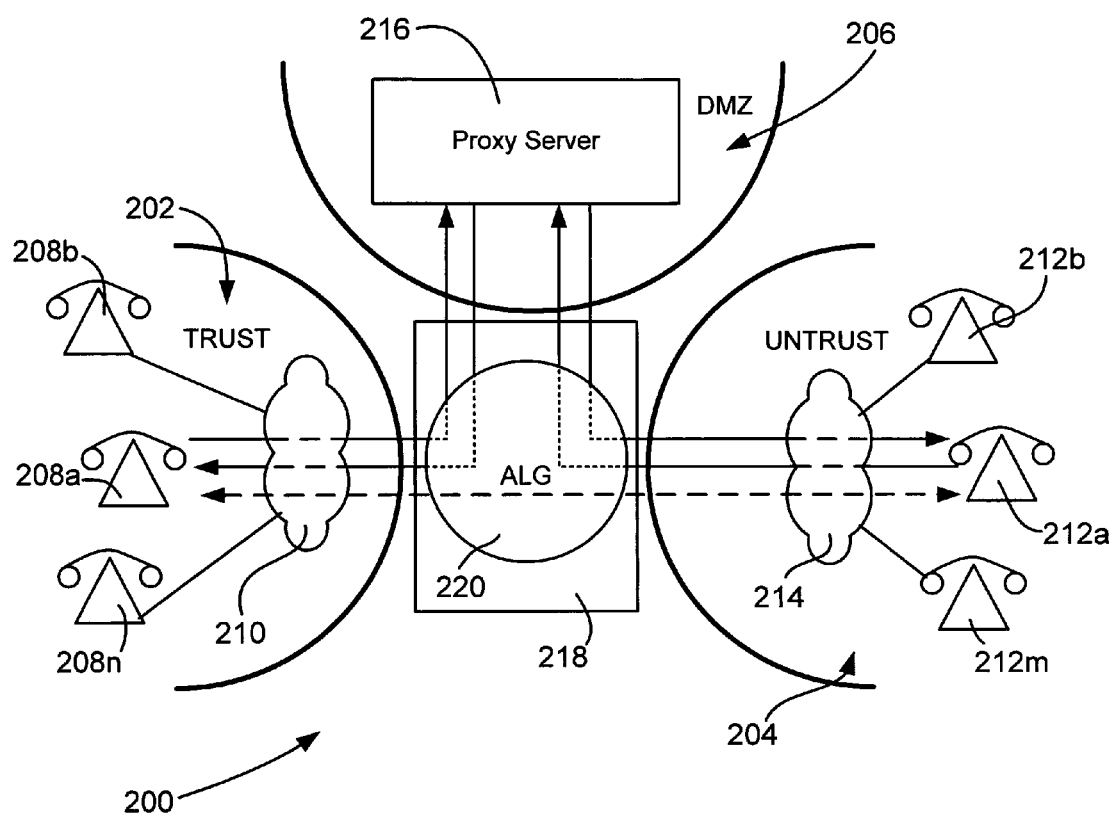
FIG. 2 illustrates an exemplary system in which systems and methods, consistent with the present invention, may be implemented.

FIG. 2 illustrates an exemplary system 200 in which embodiments of systems and methods consistent with the principles of the invention may be implemented. As illustrated, system 200 may include three distinct security zones: a TRUST zone 202, an UNTRUST zone 204, and a demilitarized zone (DMZ) 206. Additionally, system 200 may include a group of user devices 208a, 208b, and 208n (collectively "user device 208") connected to a private network 210, a group of user devices 212a, 212b, and 212m (collectively "user device 212") connected to a public network 214, a proxy server 216, and a firewall 218 that provides an interface between private network 210 in TRUST zone 202, the public network 214 in UNTRUST zone 204, and proxy server 216 in DMZ 206.

Each security zone, consistent with the principles of the invention, may provide a different level of network security based on policies applied by firewall 218. Accordingly, exchanges between entities from within the different zones are treated differently. It should be understood that the number and type of user devices 208 and 212 illustrated in FIG. 2, are provided for simplicity. In practice, a typical system may include a number and type of user devices 208 and 212. In addition, although a three zone security system has been described, the present invention may also be implemented in a system having more than three distinct security zones, including multiple zones configured either physically or logically within the system.

User devices 208 and 212 may include devices, such as personal computers, laptops, SIP telephone devices, H.323 telephone devices, analog telephone devices, or other devices capable of initiating, transmitting, and receiving voice and data communications to/from networks 210 and 214. User devices 208 and 212 facilitate real-time audio or video communications across networks 210 and 214 via firewall 218.

In one implementation consistent with principles of the invention, firewall 218 may include any combination of hardware and software (e.g., a firewall, etc.) capable of applying security policies to network traffic between user devices 208 and 212 and proxy server 216 via any networks associated therewith. As described in additional detail below, in one implementation consistent with principles of the invention, firewall 218 may be configured to include an application level gateway (ALG) 220 that performs advanced network address translation (NAT) services on network traffic leaving Trust zone 202 in order to secure user devices 208 from external traffic. More specifically, firewall 218 may initially modify or translate any IP address information contained within both the header and payload of outgoing call set-up messages received from user device 208 for calls to user devices outside of Trust zone 202 (e.g., one of user devices 212). As described above, NAT helps protect the trusted network from exposure to unwanted traffic by translating private IP addresses and ports into publicly routable IP addresses and ports, which are then used to identify the local user to remote users.

In the case of a SIP INVITE message, a source or caller IP address and port information may be contained within the contact and via fields of the packet header. Additionally, caller IP address and port information relating to the expected media to be transmitted between the parties may be found in session description protocol (SDP) information contained in the packet payload. The contact field relates to the calling party's IP or SIP address regardless of route (i.e., a direct response address), whereas the via field relates to all addresses passed through during the route the message has taken to reach the firewall. SDP information may include session name and purpose, session time, type of media (e.g., voice or video), media format (e.g., MPEG), transport protocol (e.g., RTP) and port number, bandwidth requirements, and contact information. By performing NAT on the above-identified address and port information, firewall 218 secures user device 208 from unauthorized access and identification.

Networks 210 and 214 may include on or more networks, such as the Internet, an intranet, a local area network (LAN), a wide area network (WAN), or another type of network that is capable of transmitting voice and data communications from a source device to a destination device. Networks 210 and 214 may also include one or more public switched telephone networks (PSTNs) and associated gateway devices. In alternative implementations, an additional network (not shown) may also be provided between proxy server 216 and firewall 218. This additional network may connect various network devices within each of the three security zones.

Figure 3:
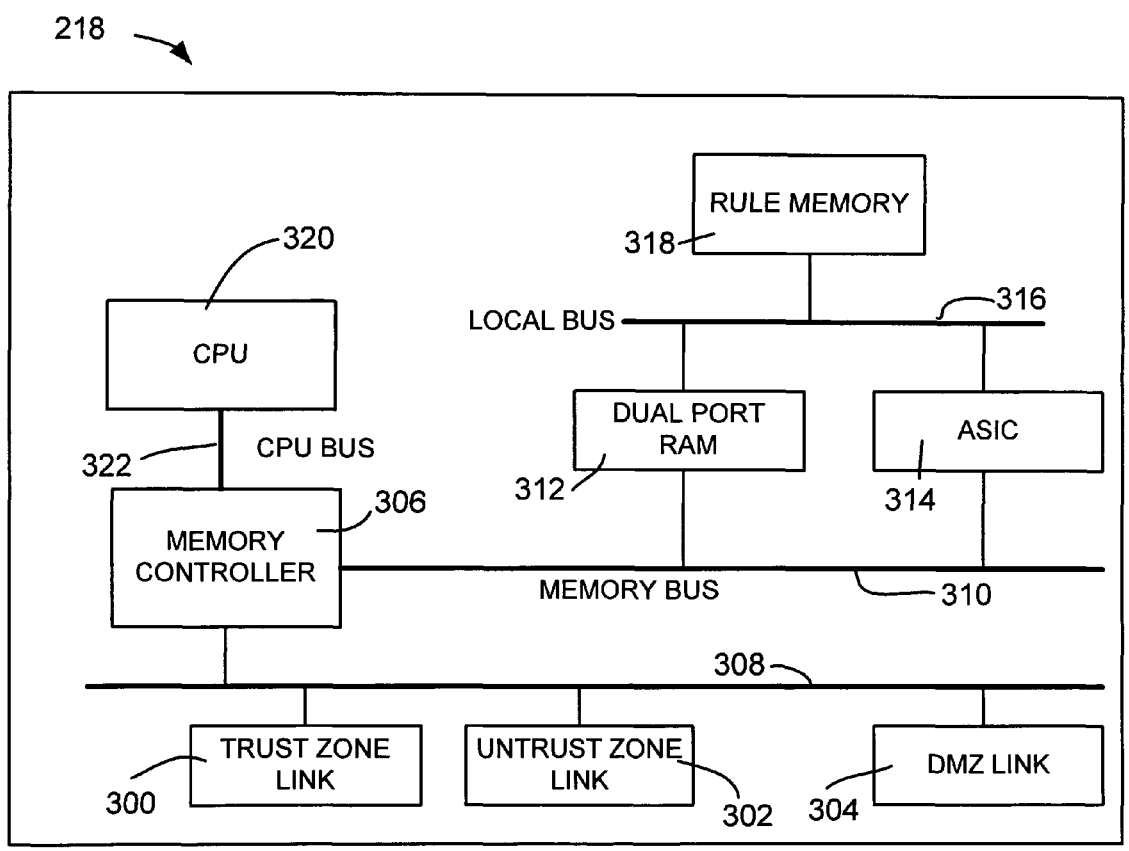
FIG. 3 illustrates an exemplary configuration of a firewall in an implementation consistent with principles of the invention.

FIG. 3 illustrates an exemplary configuration of firewall 218 in an implementation consistent with principles of the invention. As illustrated, firewall 218 may include a TRUST zone link 300, an UNTRUST zone link 302, a DMZ zone link 304 and memory controller 306 coupled by a bus 308. In operation, firewall 218 may be a gateway between three distinct networks, or distinct portions of a network. The gateway can bridge between trusted and untrusted portions of a network or provide a bridge between a public and private network. Each network link 300, 302, and 304 may be an Ethernet link that includes an Ethernet media access controller (MAC) and Ethernet physical layer (PHI) for allowing the communication system to receive/send packets from/to networks. A memory bus 310 couples a memory controller 306 to a dual-port memory 312 and an application specific integrated circuit (ASIC) 314. Local bus 316 also links ASIC 314 to dual-port, memory 312. Dual-port memory 312 may be a random access memory (RAM) having two separate ports. Any memory location may be accessed from the two ports at the same time.

Associated with ASIC 314 may be an off-chip rule memory 318 for storing a portion of the software rules for screening packets. Local bus 316 couples rule memory 318 to ASIC 314. In one implementation, off-chip rule memory 318 may be a static RAM and may be used to store policy data. A central processor (CPU) 320 may be coupled to memory controller 306 by CPU bus 322. In operation, CPU 320 oversees the memory transfer operations on memory bus 310 and bus 308.

In one implementation consistent with principles of the invention, firewall 218 manages VoIP traffic between the TRUST, UNTRUST, and DMZ zones by dynamically identifying call traffic, thereby linking seeming unrelated call messages. Further, pinholes created for facilitating traffic flow through previously unknown IP addresses and ports may be dynamically altered to enable a more efficient flow of information between the parties. Additional details relating to these features will be set forth in additional detail below.

EXEMPLARY PROCESSING

Figure 4:
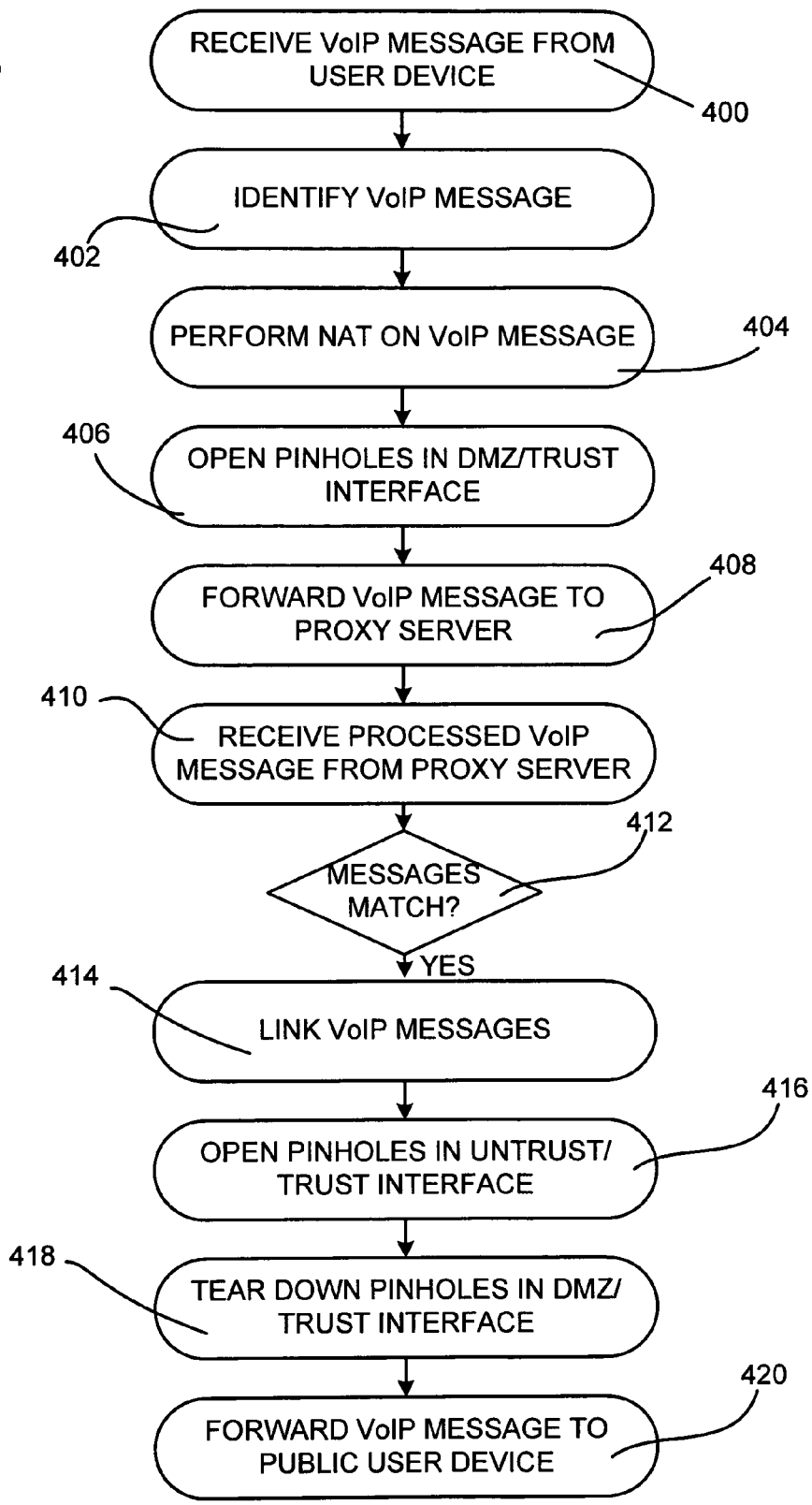
FIG. 4 is an exemplary flow diagram illustrating one implementation of processing for routing outgoing VoIP messages where the caller, the recipient, and the proxy server are in different security zones.

As described above, firewall 218 enables exchange of VoIP call setup and media messages between parties located in multiple (e.g., more than two) security zones. FIG. 4 is an exemplary flow diagram illustrating one implementation of processing for routing outgoing VoIP messages (e.g., SIP INVITE messages) where the caller (e.g., user device 208a) is in TRUST zone 202, the recipient (e.g., user device 212a) is in UNTRUST zone 204, and a proxy server (e.g., proxy server 216) is in DMZ 206. As shown in FIG. 4, firewall 218 initially receives a VoIP message from user device 208a (act 400). As mentioned above, each VoIP message may include private IP addresses and port designations in various portions of the message, including both header fields and the body or payload of the message. Accordingly, firewall 218 identifies the VoIP message (act 402) and performs NAT on any private addresses/ports contained therein (act 404).

Once NAT has been completed, firewall 218 opens pinholes on the DMZ/TRUST interface for facilitating return messages and VoIP media (act 406). As discussed above, these pinholes enable subsequent traffic addressed to the addresses and ports described in the VoIP message to be transmitted through firewall 218. In one implementation, discrete pinholes may be created for signaling packets and media packets, since each type of packet may be addressed to and received by different addresses and/or ports on firewall 218.

Following initial pinhole creation, firewall 218 forwards the VoIP message to proxy server 216 for name resolution, recipient location and call routing (act 408). In one implementation consistent with principles of the invention, because user device 212a is in UNTRUST zone 204, the VoIP message must again traverse firewall 218 prior to entering UNTRUST zone 204. Accordingly, firewall 218 next receives the VoIP message from proxy server 216 (act 410).

At this point, firewall 218 examines the VOIP message and determines whether the call to which the current VoIP message is associated matches any earlier handled call messages (act 412). In one implementation consistent with principles of the invention, this may be accomplished by examining a CALL-ID or similar field contained within the header of the VoIP message that uniquely identifies the call to firewall 218. If the CALL-ID value in the VoIP message received from proxy server 216 in act 410 matches the CALL-ID value received from user device 208a in act 400, a link is created between the two calls (act 414). Once a link is established, new pinholes in firewall 218 are opened between user device 208a and user device 212a at the TRUST/UNTRUST and UNTRUST/TRUST interfaces to firewall 218, respectively. These pinholes enable contact-related, call signaling, and media messages to be exchanged directly between user device 208a and user device 212a, without flowing through proxy server 216 (act 416). The pinholes created at the DMZ/TRUST interface are then torn down (act 418) and the VoIP message is forwarded to user device 212a (act 420). In one implementation consistent with principles of the invention, signaling messages may continue to be directed through proxy server 216. In this implementation, the signaling pinhole created at the firewall 218's UNTRUST interface instead points to proxy server 216 at firewall 218's DMZ interface. Further, the related pinhole at firewall 218's DMZ/UNTRUST interface is maintained to enable signaling messages to flow from proxy server 216 to user device 208a through firewall 218.

Figure 5A:
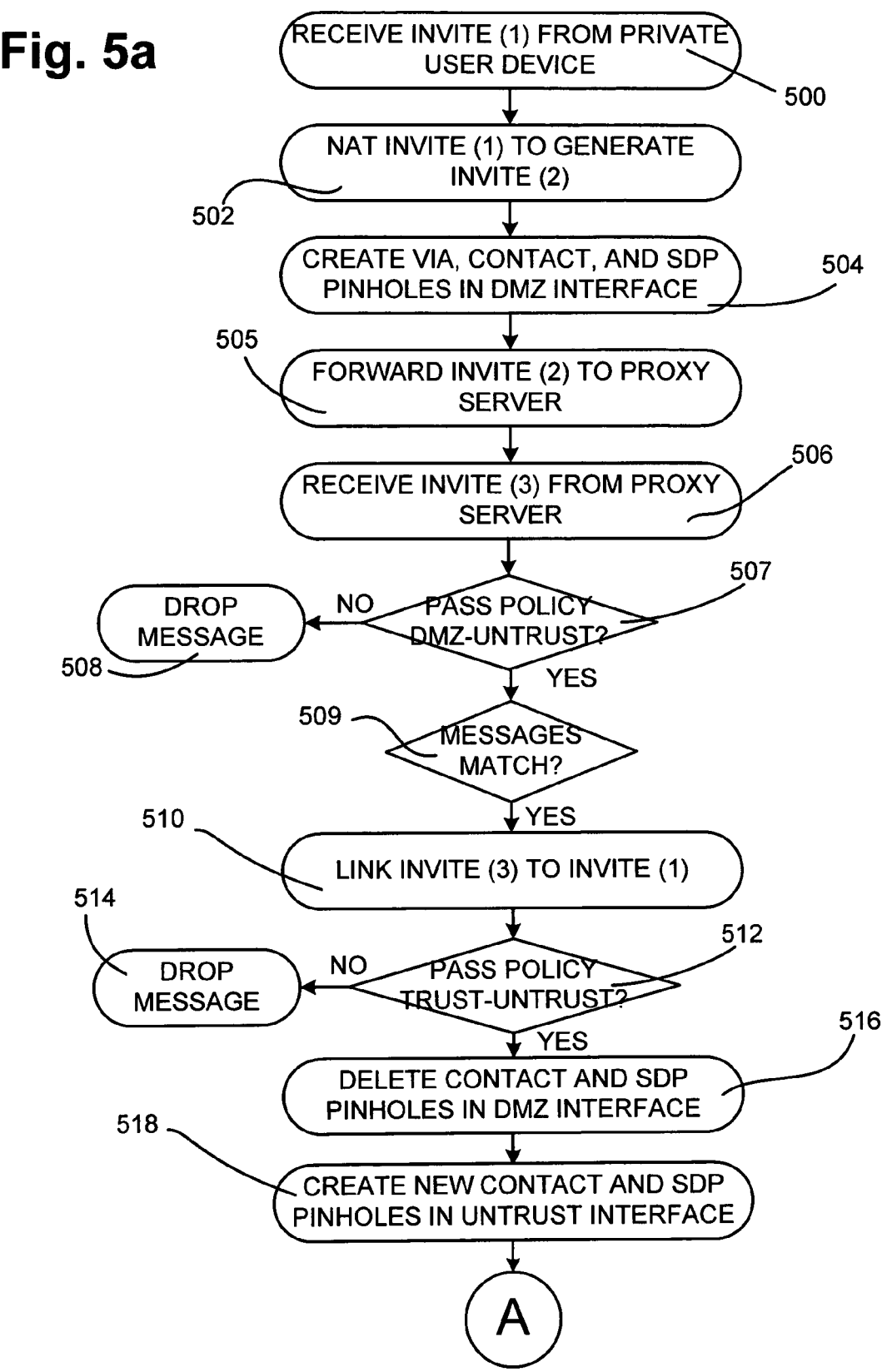
FIGS. 5a-c are exemplary flow diagrams illustrating one implementation of a method for routing SIP messages across multiple security zones.
Figure 5B:
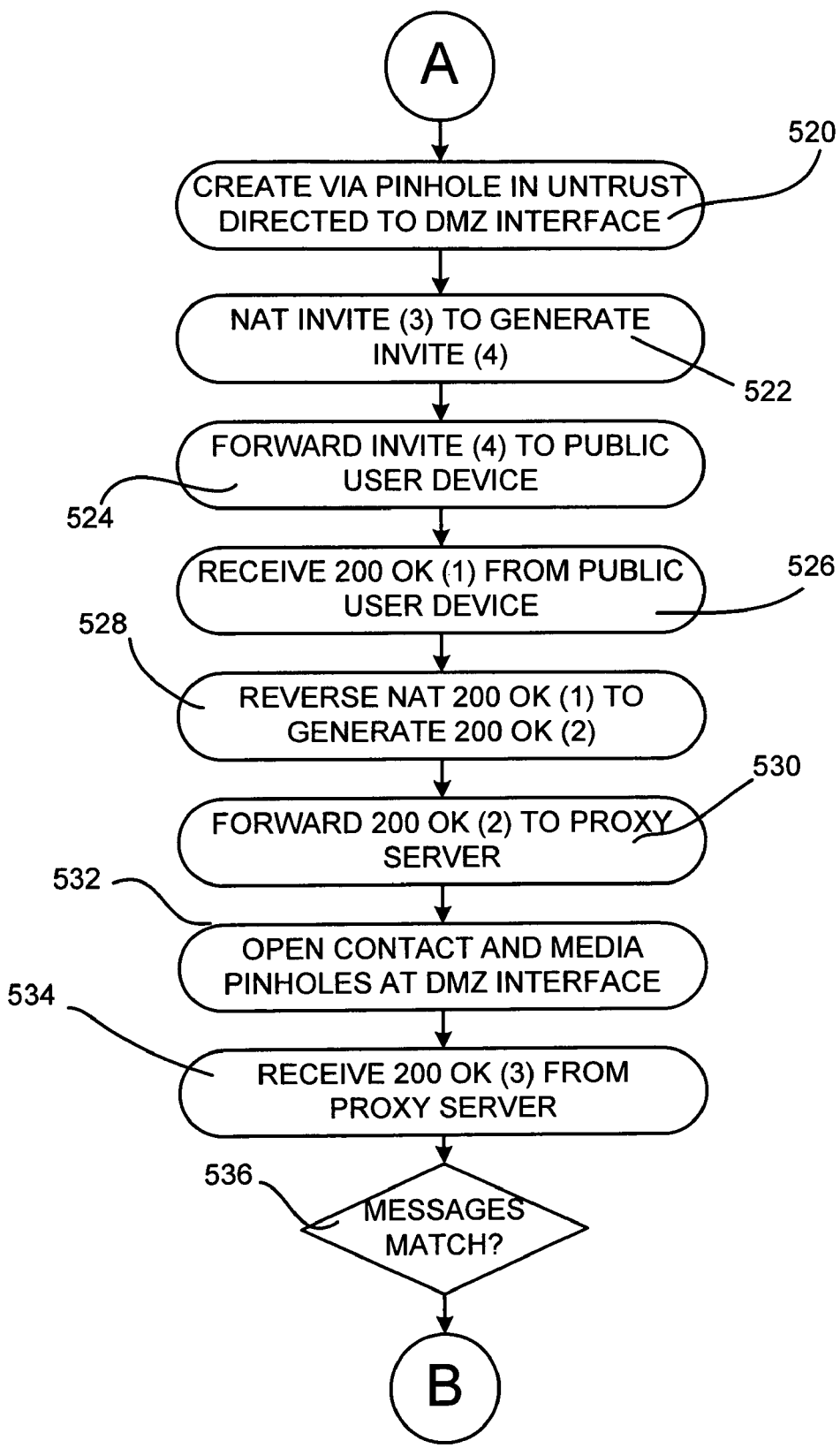
Figure 5C:
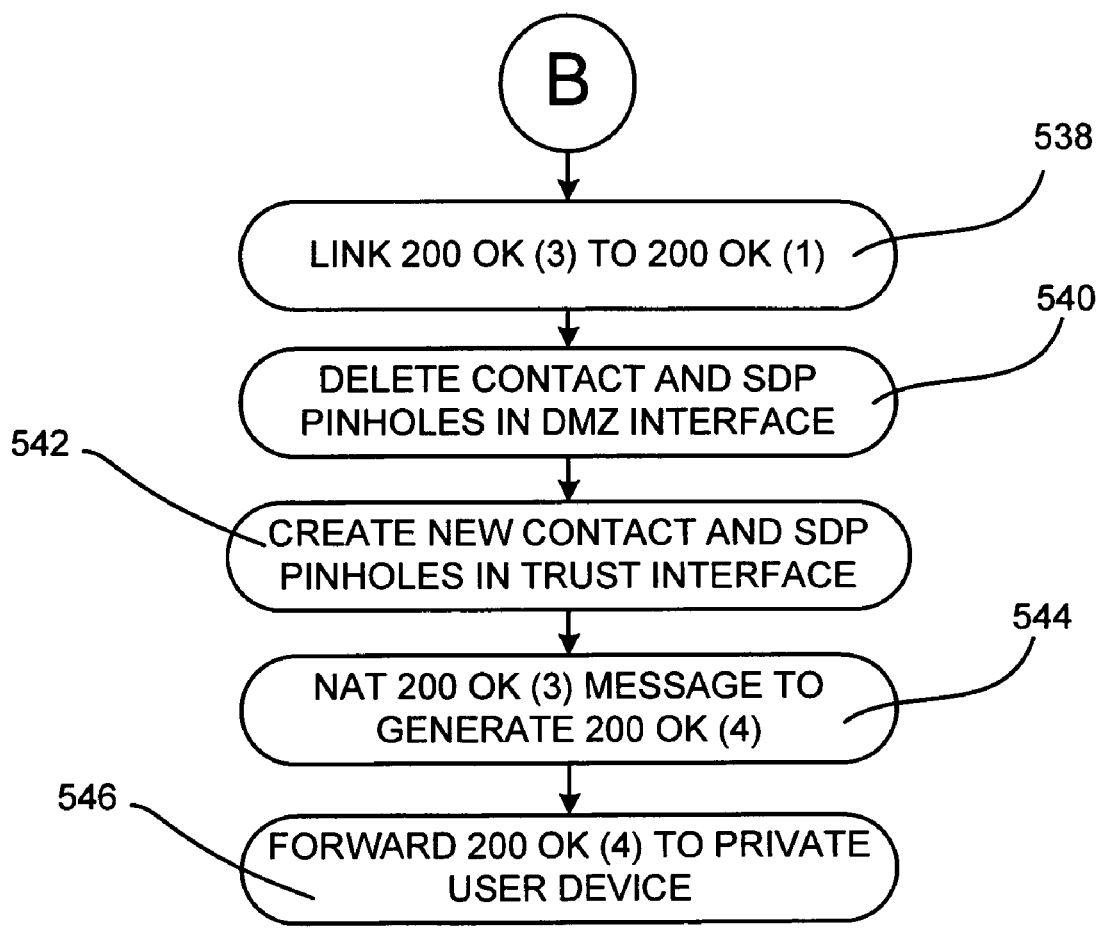

FIGS. 5a-c are exemplary flow diagrams illustrating one implementation of a method for routing SIP messages across multiple security zones. Initially, firewall 218 receives an INVITE (1) message from user device 208a (act 500). The INVITE (1) message includes private IP addresses and ports in at least the contact and via fields from the message header as well as the media addressing and other information from the message's payload. In response, firewall 218 performs network address translation on the various IP addresses and ports contained within the INVITE (1) message to generate a modified INVITE (2) message (act 502). Next, firewall 218 creates discrete pinholes through its DMZ interface for each of the translated (e.g., network address translated) address/port combinations (i.e., via, contact and SDP) (act 504). The modified INVITE (2) message is then forwarded to proxy server 216 (act 505).

In one implementation consistent with principles of the invention, a Record-Route feature may be enabled by proxy server 216. With Record-Route enabled, all signaling messages exchanged during the call session, including acknowledgement and bye messages, are passed through proxy server 216. This enables proxy server 216 to log the length of the call and other features implemented. In one embodiment, enabling or disabling Record-Route is accomplished by inserting or removing proxy server 216's IP address or URI into a Record-Route header field in the INVITE message. If Record-Route is not enabled, signaling messages following the 200 OK message are exchanged between the calling parties directly, excluding proxy server 216 from the remainder of the message exchanges. A 200 OK response is one of several suitable responses from user device 212a and represents a successful reception and acceptance of the INVITE message.

Following called party location and call routing processing by proxy server 216, firewall 218 receives a processed INVITE (3) message at its DMZ interface (act 506). Initially, it is determined whether a policy exists which enables the INVITE (3) message to pass from the DMZ to UNTRUST zone 204 (act 507). If not, the message is dropped (act 508). However, if a policy enables the message to pass, similar to the discussion above, with respect to FIG. 4, firewall 218 then determines whether the received INVITE (3) message corresponds to the INVITE (1) message received from user device 208a (act 509). In one implementation, this may include determining whether CALL-ID values present in each messages' header match.

If the CALL-ID values are found to match a link is created between the two messages thereby tying responses received to the INVITE (3) message back to the original INVITE (1) message (act 510). Next the firewall 218 determines whether a policy exists which enables the INVITE (3) message to pass directly between endpoints (e.g., user device 208a and 212a) from UNTRUST zone 204 to TRUST zone 202 (act 512). If not, the message is dropped by firewall 218 and the call is canceled (act 514).

However, if a policy exists which enables message transfer from DMZ 206 to UNTRUST zone 204, the pinholes initially created at the DMZ/TRUST interface in act 504 relating to the contact and SDP information are deleted (act 516) and new pinholes are created at firewall 218's UNTRUST/TRUST interface (act 518). This enables responsive messages to be received at firewall 218's UNTRUST interface and forwarded directly to user device 208a in TRUST zone 202, rather then through proxy server 216. Additionally, new pinholes relating to the top-most via address and port and the Record-Route address and port (if enabled) are created at firewall 218's UNTRUST interface pointing to proxy server 216, thereby enabling forwarding of via and record-route-related signaling messages to proxy server 216 (act 520).

In one implementation consistent with principles of the invention, INVITE (3) message is then network address translated by firewall 218 in order to modify the addressing information relating to media exchange (i.e., SDP information) to provide the addressing information for firewall 218's UNTRUST interface to generate an INVITE (4) message (act 522). The INVITE (4) message is then forwarded to user device 212a (act 524).

Assuming, for the purposes of simplicity, that user device 212a is available and elects to receive the INVITE (4) message, a 200 OK (1) response message may be received at firewall 218 from user device 212a (act 526). A 200 OK response is one of several suitable responses from user device 212a and represents a successful reception and acceptance of the INVITE message. Other responses may include informational or provisional responses (1xx), redirection messages (3xx), client error messages (4xx), and server error messages (5xx). As is known in the art, messages other than a 200 OK message may result in retransmission of the INVITE (4) message or dropping of the call.

Once the 200 OK (1) message has been received, it is reverse network address translated to translate the public addresses and ports to their private counterparts (act 528). This generates a 200 OK (2) message that is then forwarded to proxy server 216 (act 530). Additionally, pinholes for contact and media are opened at firewall 218's DMZ interface to enable flow of messages from proxy server 216 to user device 208a through firewall 218 (act 532). Following processing (e.g., DNS resolution, etc.) by proxy server 216, a 200 OK (3) message is forwarded through the created pinholes to firewall 218 (act 534).

Firewall 218 then determines whether the received 200 OK (3) message corresponds to the 200 OK (1) message received from user device 212a (act 536). In one implementation, this may include determining whether CALL-ID values present in each messages' header match. If the CALL-ID values are found to match a link is created between the two messages thereby tying responses received to the 200 OK (3) message back to the original 200 OK (1) message (act 538).

Next, pinholes initially created at the UNTRUST/DMZ interface in act 532 relating to the contact and SDP information are deleted (act 540) and new pinholes for contact and SDP are created at firewall 218's TRUST/UNTRUST interface (act 542). This enables media and contact-related messages to be received at firewall 218's TRUST interface and forwarded directly to user device 212a on the UNTRUST interface, rather then through proxy server 216.

The 200 OK (3) message is then reverse network address translated to identify user device 208a's private IP address and ports (act 544). This generates a 200 OK (4) message that is then forwarded to user device 208a (act 546).

As is known in the art, user device 208a may, in response to a received 200 OK message, generate and forward an ACK message that acknowledges receipt of the 200 OK message by user device 208a and enables subsequent media transmission between the parties. Details regarding the transmission of the ACK message and subsequent messages (e.g., BYE, etc.) are performed in a manner substantially similar to that described above. It should be noted, that when Record-Route is enabled, the ACK and BYE messages traverse proxy server 216 on their way to user device 212a. Conversely, with Record-Route disabled, these messages pass directly between user devices 208a and 212a.

Figure 6:
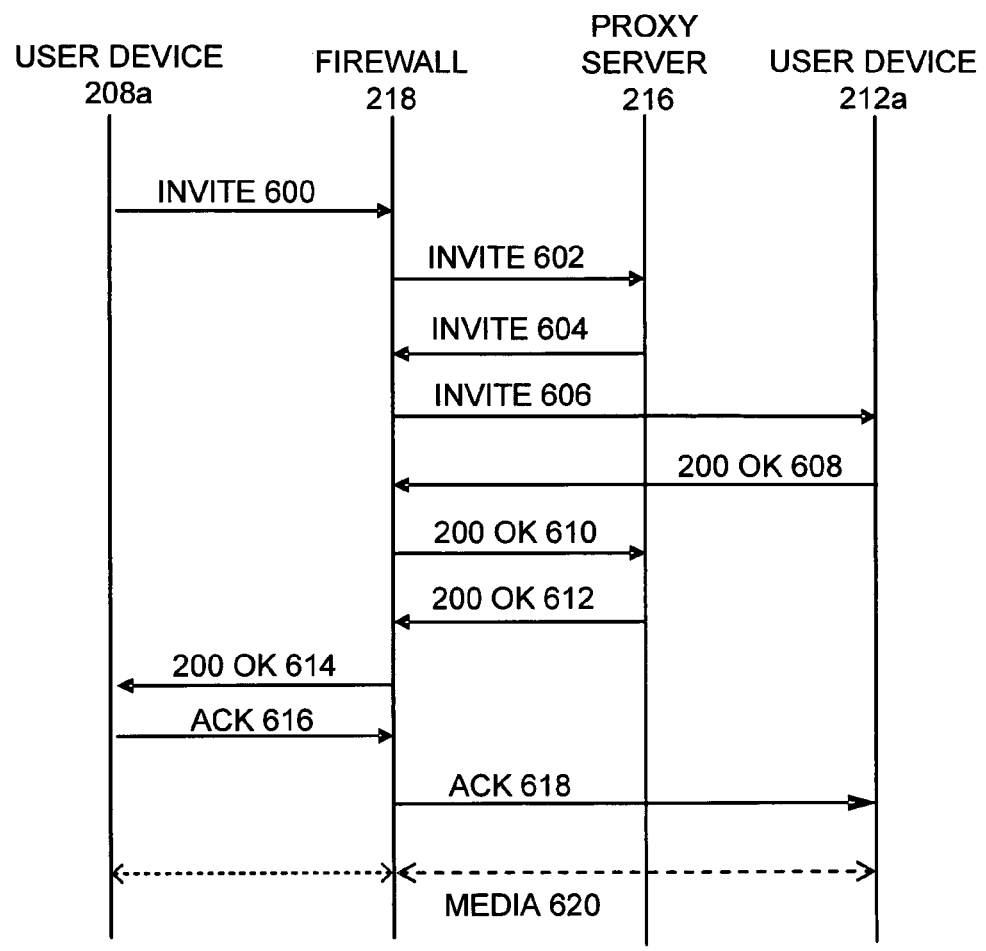
FIG. 6 is an exemplary call flow diagram illustrating the flow of call messages between a private user device, a firewall, a proxy server, and public user device in accordance with one implementation consistent with principles of the invention.

FIG. 6 is an exemplary call flow diagram illustrating the flow of call messages between user device 208a, firewall 218, proxy server 216 and user device 212a in accordance with one implementation consistent with principles of the invention. Initially, an INVITE message 600 is sent from user device 208a to firewall 218. In one implementation consistent with principles of the invention, INVITE message 600 may be a SIP message having the form:
INVITE sip:bob@university.edu SIP/2.0
CSeq: 1 INVITE
To: sip:bob@university.edu
From: alice<sip:alice@5.5.5.1>
Call-ID: 1234567@5.5.5.1
Via: SIP/2.0/UDP 5.5.5.1:5060
Contact: <sip:alice@5.5.5.1>
Subject: no subject
Content-Type: application/sdp
Content-Length: 123
v=0
o=982769551076 982769551076 IN IP4 5.5.5.1
c=IN IP4 5.5.5.1
m=audio 45002 RTP/AVP 0

In the manner described in detail above, firewall 218 performs NAT on the INVITE message 600 to generate an INVITE message 602. In one implementation, NAT'ed INVITE message 602 may have the form:
INVITE sip:bob@university.edu SIP/2.0
CSeq: 1 INVITE
To: sip:bob@university.edu
From: alice<sip:alice@6.6.6.1>
Call-ID: abcdefg@6.6.6.1
Via: SIP/2.0/UDP 6.6.6.1:5060
Contact: <sip:alice@6.6.6.1>
Subject: no subject
Content-Type: application/sdp
Content-Length: 123
v=0
o=982769551076 982769551076 IN IP4 6.6.6.1
c=IN IP4 6.6.6.1
m=audio 52002 RTP/AVP 0 where the IP addressees designated in the from, via, and contact fields and the RTP port designated in the "m" field of the SDP information have all been translated to their publicly routable values.

Firewall 218 next forwards INVITE message 602 through its TRUST/DMZ interface to proxy server 216 while simultaneously opening pinholes to facilitate return traffic from proxy server 216. As discussed above, three distinct pinholes are opened for traffic related to each of contact, via, and SDP information. Once processed by proxy server 216 (e.g., name resolution, routing, etc.), firewall 218 receives the INVITE message 604 from proxy server 216.

As discussed above, it is then determined whether a policy exists which enables the INVITE message 604 to pass from the DMZ 206 to UNTRUST zone 204. If, so, firewall 218 then determines whether the received INVITE (3) message corresponds to the INVITE (1) message received from user device 208a (act 509). In one implementation, this may include determining whether CALL-ID values present in each messages' header match. As discussed above, firewall 218 next analyzes INVITE message 604 and determines that it matches INVITE message 600, e.g., the CALL-ID values match. These messages are then linked. Next, the addressing information within INVITE message 600 relating to media exchange (i.e., SDP information) is again network address translated to provide the addressing information for firewall 218's UNTRUST interface. At this point the pinholes in the DMZ interface pointing to TRUST zone 202 are modified to reflect the specific needs of media traffic. That is, since only call signaling messages are exchanged through proxy server 216, it is necessary to facilitate exchange of non-signaling messages directly between user devices 208a and 212a. Accordingly, the pinholes relating to contact and media traffic in firewall 218's DMZ interface are deleted and new pinholes for contact and media traffic are created in firewall 218's UNTRUST interface pointing directly to TRUST zone 204. Additionally, a third pinhole in firewall 218's UNTRUST interface is created for via messages and points to the DMZ interface and proxy server 216. This enables call setup and other via messages to still be routed through proxy server 216.

Once the proper setup of pinholes has been created, firewall 218 sends INVITE message 606 to user device 212a. Although not shown for reasons of simplicity, additional entities may be positioned between firewall 218 and user device 212a, for example, redirect servers, additional proxy servers, additional firewalls, etc. In response to the INVITE message 606, user device 212a transmits a 200 OK message 608 indicating that they are available and ready to accept the call from user device 208a. It should be understood that additional messages may be passed between the call participants and have been ignored for the purposes of brevity. Such additional messages may include a TRYING message indicating that proxy server 216 is forwarding the INVITE message to user device 212a, a RINGING message indicating that the INVITE message was received by user device 212a, but that it has not yet been accepted or denied, etc.

Upon receipt, 200 OK message 608 is reverse network address translated by firewall 218 to identify the private IP addresses and ports to which the message should be directed. This generates a 200 OK message 610. Because 200 OK message 608 is a signaling message, the address and port indicated in its via field are used to identify the next destination for the message. In this instance, 200 OK message 610 is forwarded to proxy server 216. Following proxy server processing/logging, a 200 OK message 612 is received by firewall 218 from proxy server 216.

As discussed above, firewall 218 next analyzes the received 200 OK message 612 and determines that it matches 200 OK message 608. If so, these messages are then linked. At this point the pinholes for media and contact in DMZ interface pointing to UNTRUST zone 204 are deleted and replacement pinholes in the TRUST interface pointing to the UNTRUST zone 204 are added to facilitate exchange of contact and media message directly from user device 208a to user device 212a. 200 OK message 614 is then forwarded to user 208a over firewall 218's TRUST interface.

Upon receipt of 200 OK message 614, firewall 218 receives an ACK message 616 for user device 208a. Firewall 218 then performs NAT on ACK message 616 to generate an ACK message 618. ACK message 618 is then routed directly to user device 212a. At this point, media 620 may pass between user 208a and user 212a directly.

Although the above implementations referenced in FIGS. 5-6 describe a VoIP message exchange system incorporating the SIP protocol, this should not be construed as a limitation of the invention. Rather, the methodologies and principles of the invention are equally applicable to systems implementing the H.323 protocol, the media gateway control protocol (MGCP), the skinny client control protocol, or mixed systems utilizing combinations of these protocols.

CONCLUSION

Implementations consistent with principles of the invention provide for routing of VoIP call messages through more than two distinct security zones. More particularly, firewall pinholes may be dynamically altered in response to call needs so as to facilitate efficient communication between the call parties. As a result, benefits of implementing NAT and firewall DMZ's (or other types of distinct security zones) may be incorporated into a VoIP scheme.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention.

Moreover, while a series of acts has been disclosed with regard to FIGS. 4-6 the order of the acts may be varied in other implementations consist with the present invention. Furthermore, non-dependent acts may be implemented in parallel.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" or be referred to as an "engine" that performs one or more functions. This logic/engine may include hardware, such as an application specific integrated circuit (ASIC) or a field programmable gate array, software, or a combination of hardware and software. While aspects have been described in terms of processing messages or packets, these aspects may operate upon any type or form of data, including packet data and non-packet data. The term "data unit" may refer to packet or non-packet data.

No element, act, or instruction used in description of the present invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed is:

1. A method for routing voice packets across multiple security zones, the method comprising:
  performing, with a firewall, call setup signaling across at least a first security zone, a second security zone, and a third security zone to set up a call through the firewall between a first user device in the first security zone and a second user device in the third security zone, where setting up the call includes:
    receiving, with the firewall, a call invitation message from the first user device in the first security zone, where the call invitation message includes private addressing information comprising:
      a source address, associated with the first user device, included in a header of the call invitation message, and
      address information, associated with media to be transmitted between the first user device and the second user device, included in a body of the call invitation message,
    identifying, with the firewall, the private addressing information in the call invitation message,
    translating, with the firewall, the identified private addressing information into publicly routable addressing information,
    establishing, with the firewall and based on the private addressing information, at least one first gate between the first security zone and the second security zone, where the at least one first gate includes a discrete pinhole for signaling packets associated with the call and another discrete pinhole for media packets associated with the call,
    forwarding, with the firewall and based on establishing the at least one first gate, the call invitation message, including the publicly routable addressing information, to a proxy server in the second security zone,
    receiving, with the firewall, a processed call invitation message from the proxy server, where the processed call invitation message includes portions of the call invitation message,
    establishing, with the firewall, a link between the call invitation message and the processed call invitation message based on the included portions of the call invitation message,
    tearing down, based on establishing the link, the discrete pinhole for media packets,
    establishing, with the firewall and based on establishing the link and tearing down the discrete pinhole for media packets, at least one second gate between the first security zone and the third security zone,
      where the at least one second gate includes a discrete pinhole for media packets that permits media messages associated with the call to be transmitted, via the firewall, directly between the first security zone and the third security zone, and where the at least one second gate includes a discrete pinhole for signaling messages that points to the proxy server to direct signaling messages associated with the call through the proxy server, and forwarding, with the firewall, the processed call invitation message to the second user device in the third security zone.

2. The method of claim 1, where the at least one first gate is established to return traffic from the proxy server to the first user device.

3. The method of claim 2, where the at least one first gate includes at least a first signaling gate that includes the discrete pinhole for signaling packets and a first media gate that includes the discrete pinhole for media packets.

4. The method of claim 1, where establishing, with the firewall, the at least one second gate between the first security zone and the third security zone, further comprises:

determining, with the firewall, that a field of a header of the processed call invitation message matches a field of the header of the call invitation message received from the first user device, and establishing, with the firewall, the at least one second gate between the first security zone and the third security zone when the firewall determines that the field of the header of the processed call invitation message matches the field of the header of the call invitation message received from the first user device.

5. The method of claim 4, where establishing the at least one second gate between the first security zone and the third security zone further includes:

establishing the at least one second gate in a third security zone interface for enabling return traffic to pass from the second user device to the first user device.

6. The method of claim 5, further comprising:

forwarding the processed call invitation message when a security policy exists that enables the received processed call invitation message to pass to the second user device from the proxy server.

7. The method of claim 4, where determining that the field of the header of the processed call invitation message matches the field of the header of the call invitation message received from the first user device further comprises:

determining that a CALL-ID value in the header of the processed call invitation message matches a CALL-ID value in the header of the call invitation message received from the first user device.

8. The method of claim 4, further comprising:

determining, upon receipt of the processed call invitation message, whether a security policy exists that enables the received processed call invitation message to pass to the second user device from the proxy server; and dropping the processed call invitation message when a security policy does not exist that enables the received processed call invitation message to pass to the second user device from the proxy server.

9. The method of claim 4, where the processed call invitation message, received from the proxy server, includes proxy server private addressing information.

10. The method of claim 9, further comprising:

identifying the proxy server private addressing information in the processed call invitation message;

translating the identified proxy server private addressing information into publicly routable addressing information to generate a translated call invitation message; and forwarding the translated call invitation message to the second user device on the third security zone interface.

11. The method of claim 1, where the proxy server comprises a session initiation protocol (SIP) proxy and the call invitation message comprises a SIP Invite message including at least contact information, via information, and SDP information.

12. The method of claim 1, where the proxy server comprises an H.323 gatekeeper and the call invitation message comprises an H.323 Request message.

13. The method of claim 1, where the at least one first gate, established between the first security zone and the second security zone, includes:

at least a first contact gate directed from the second security zone to the first user device, a first via gate directed from the second security zone to the first user device, and a first media gate directed from the second security zone to the first user device.

14. The method of claim 13, where tearing down the discrete pinhole for media packets includes:

deleting the first contact gate and the first media gate, and where establishing the at least one second gate includes:

establishing a second contact gate between the first security zone and the third security zone directed from the third security zone to the first user device; and establishing a second via gate between the first security zone and the third security zone directed from the third security zone to the proxy server for enabling return traffic relating to call setup and tear down messages to pass from the second user device to the proxy server.

15. A network device for routing voice over internet protocol (VoIP) call messages across multiple security zones, the network device comprising:

at least one TRUST zone interface to receive a call invitation message from a first user device located in first security zone, where the call invitation message includes private addressing information;

at least one demilitarized zone (DMZ) interface to communicate with at least one proxy server located in a second security zone;

at least one UNTRUST interface to communicate with at least one second user device located in third security zone; and application level gateway (ALG) component to dynamically route the VoIP call messages between the first user device, the at least one proxy server, and the second user device, and to selectively control communication between the first user device, the at least one proxy server, and the second user device, where the ALG component is further to:

receive the call invitation message, identify the private addressing information, translate the identified private addressing information into publicly routable addressing information, establish, based on the private addressing information, a first pinhole and a second pinhole in the DMZ interface, where the first pinhole is established to transmit signaling data and the second pinhole is established to transmit media data, forward, through the at least one DMZ interface, the call invitation message, including the publicly routable addressing information, to the at least one proxy server in the second security zone, receive, through the at least one DMZ interface, a processed call invitation message from the at least one proxy server, where the processed call invitation message includes portions of the call invitation message, tear down, in response to receiving the processed call invitation message, the second pinhole, establish, in response to tearing down the second pinhole, a third pinhole and a fourth pinhole in the at least one UNTRUST interface, where the third pinhole is to transmit media data and the fourth pinhole points to the at least one proxy server to direct signaling via the at least one proxy server and the first pinhole, and forward, through the at least one UNTRUST interface, the processed call invitation message to the second user device in the third security zone.

16. The network device of claim 15, where the ALG component is further to:

match the processed call invitation message with the call invitation message received from the first user device, and where the third pinhole and the fourth pinhole are established based on the matching; and create a signaling pinhole in the third security zone interface for enabling return traffic, relating to call setup and tear down messages, to pass from the second user device to the proxy server.

17. The network device of claim 16, where the ALG component is further to:

determine, upon receipt of the processed call invitation message, whether a security policy exists that enables the received processed call invitation message to pass to the second user device from the proxy server; and drop the processed call invitation message when a security policy does not exist that enables the received processed call invitation message to pass to the second user device from the proxy server.

18. The network device of claim 15, where the proxy server comprises a session initiation protocol (SIP) proxy and the call invitation message comprises a SIP Invite message.

19. A device, comprising:

a memory to store instructions; and a processor to execute the instructions to:

receive call invitation related messages from a private user device located in first security zone; and dynamically route the call invitation related messages, based on the call invitation messages, between the private user device, a proxy server, and a public user device in multiple security zones, where each of the private user device, the proxy server, and the public user device are in a separate one of the multiple security zones, and where communication between the private user device, the proxy server, and the public user device is selectively controlled, where, when dynamically routing the call invitation related messages, the processor is further to:

receive a call invitation message from the first user device in the first security zone, where the call invitation message includes private addressing information, identify the private addressing information, translate the identified private addressing information into publicly routable addressing information to generate publicly routable addressing information, establish, based on the private addressing information, a plurality of pinholes in a security interface associated with the first security zone and the second security zone, where at least a first one of the plurality of pinholes is established to transmit signaling data and at least a second one of the plurality of pinholes is established to transmit media data, forward, via the security interface, the call invitation message, including the publicly routable addressing information, to a proxy server in the second security zone, receive, via the security interface, a processed call invitation message from the proxy server, where the processed call invitation message includes portions of the call invitation message, tear down the at least the second one of the plurality of pinholes, create, based on the processed call invitation message and tearing down the at least one of the plurality of pinholes, media pinholes and signaling pinholes, in a security interface, between the first security zone and the third security zone, that permit traffic flow for a call between the first security zone and the third security zone, where the signaling pinholes in the security interface between the first security zone and the third security zone are created to cause signaling messages to be routed through the proxy server and the at least the first signaling pinhole in the security interface between the first security zone and the second security zone, and forward the processed call invitation message to the second user device in the third security zone.

20. The device of claim 19, where, when dynamically routing the call invitation related messages, the processor is further to:

match the processed call invitation message with the call invitation message received from the private user device.

* * * * *